(12) United States Patent
Choi et al.

(10) Patent No.: US 8,819,415 B2
(45) Date of Patent: Aug. 26, 2014

(54) METHOD AND DEVICE FOR AUTHENTICATING PERSONAL NETWORK ENTITY

(75) Inventors: Seok-Hoon Choi, Seoul (KR); Sung-Jin Park, Hwaseong-si (KR); Dong-Hoon Lee, Seoul (KR); Jung-Ha Paik, Seoul (KR); Hyo-Jin Jo, Seoul (KR)

(73) Assignees: Samsung Electronics Co., Ltd (KR); Korea University Research and Business Foundation (KR)

( * ) Notice: Subject to any disclaimer, the term of this patent is extended or adjusted under 35 U.S.C. 154(b) by 322 days.

(21) Appl. No.: 13/345,188

(22) Filed: Jan. 6, 2012

(65) Prior Publication Data

US 2012/0179906 A1    Jul. 12, 2012

(30) Foreign Application Priority Data

Jan. 6, 2011    (KR) ......................... 10-2011-0001224

(51) Int. Cl.
*H04L 9/32* (2006.01)
*H04L 9/08* (2006.01)
*H04L 29/06* (2006.01)

(52) U.S. Cl.
CPC ............ *H04L 9/0891* (2013.01); *H04L 9/3239* (2013.01); *H04L 63/0876* (2013.01)
USPC ........................................................ 713/155

(58) Field of Classification Search
USPC ........................................................ 713/155
See application file for complete search history.

(56) References Cited

U.S. PATENT DOCUMENTS

| | | | |
|---|---|---|---|
| 2004/0064699 A1* | 4/2004 | Hooker et al. ................. | 713/170 |
| 2006/0129812 A1* | 6/2006 | Mody ............................ | 713/168 |
| 2007/0136587 A1* | 6/2007 | Shvodian et al. ............. | 713/169 |
| 2008/0281625 A1* | 11/2008 | Shiki ................................. | 705/1 |
| 2010/0235900 A1* | 9/2010 | Robinton et al. ................. | 726/9 |
| 2013/0167210 A1* | 6/2013 | Chu et al. ........................... | 726/6 |

* cited by examiner

*Primary Examiner* — Kambiz Zand
*Assistant Examiner* — Aubrey Wyszynski
(74) *Attorney, Agent, or Firm* — The Farrell Law Firm, P.C.

(57) ABSTRACT

A method of authenticating a Personal Network Entity (PNE) is provided. The method includes transmitting a PNE serial number ($SN_{PNE}$) to a CPNS (Converged Personal Network Service) server by a Personal Network GateWay (PN GW); storing an authentication value chain of a PNE transmitted from the CPNS server and an inherent assignment key ($TK_{PNE}$) that is secret information of a corresponding PNE; encrypting a selected authentication value from among the authentication value chain with the inherent assignment key of the corresponding PNE to transmit the encrypted authentication value to the corresponding PNE and storing the encrypted authentication value in the corresponding PNE; and performing an authentication procedure between the corresponding PNE and the CPNS server by using the encrypted authentication value stored in the PNE.

21 Claims, 8 Drawing Sheets under 35 U.S.C. §119(a) to

METHOD AND DEVICE FOR AUTHENTICATING PERSONAL NETWORK ENTITY

PRIORITY

This application claims priority under 35 U.S.C. §119(a) to a Korean Patent Application entitled "Method of Authenticating Personal Network Entity" filed in the Korean Industrial Property Office on Jan. 6, 2011 and assigned Serial No. 10-2011-0001224, the entire content of which is incorporated herein by reference.

BACKGROUND OF THE INVENTION

1. Field of the Invention

The present invention relates generally to a personal network, and more particularly to a method and device for authenticating a personal network entity in a personal network.

2. Description of the Related Art

With an exponential increase in use of Consumer Electronics (CE) devices in which short distance communication is enabled (e.g., an Motion Picture Experts' Group Audio-Layer 3 (MP3) player, a Portable Multimedia Player (PMP), a game machine, a netbook, etc.), users seek methods for conveniently downloading content to such devices.

A user may search for reproducible content in consumer electronics over the Internet by using a Personal Computer (PC) and then download the searched content. After downloading the content to the PC, when a consumer electronics device and the PC are connected to each other through a dedicated cable, the consumer electronics device can download the content from the PC. In another similar process, the cable may be replaced with a Bluetooth connection (i.e., a BLUETOOTH® specification-compliant connection), and the content can be shared between devices by using a Bluetooth scheme.

However, methods by which consumer electronics devices can directly access a long distance communication network are highly limited. For example, some of consumer electronics devices can access a long distance communication network only when accessing Internet through a Wireless-Fidelity (Wi-Fi) connection in an area where there is an Access Point (AP). Accordingly, there is a need for a method by which consumer electronics devices (which may have access to short distance communications without an ability to directly access a long distance communication network) may access a long distance communication network through a gateway to download content. According to this need, a CPNS (Converged Personal Network Service) is proposed.

The CPNS refers to a service for providing a corresponding service or a content after one Personal Network (hereinafter, referred to as a "PN") configured by a combination of a device, which acts as a gateway in charge of communication with a long distance communication network, and a consumer electronics device, which reproduce an actual service and content, is constructed such that the consumer electronics device accesses a service/content providing server located in the long distance communication network through the device acting as the gateway. In such a CPNS, the device acting as the gateway is referred to as a Personal Network (PN) gateway and the consumer electronics device accessing the long distance communication network through the PN gateway are referred to as a Personal Network Entity (PNE).

Meanwhile, in such a PN, an authentication protocol suitable for each PNE is required prior to providing a service to each PNE. The authentication protocol corresponds to a protocol performed to recognize communication entities and is implemented in advance in order to perform other communications via the protocol in the future.

A method for a general device authentication protocol is largely divided into a method of using a symmetric key and a method of using a public key. However, both of methods require a secure storage apparatus for their devices since the two methods perform an authentication after storing a key. In particular, in the public key method, authentication is performed after a private key of the device is stored, and in the symmetric key method, authentication is performed after a secret key of the device is stored. However, when there is no secure storage apparatus in the device, it is possible to copy secret information from a storage space of the device vulnerable to attacks in comparison with a server, so that the copied secret information may be used for a malicious authentication of the device.

However, the PNE device cannot directly communicate with the PN server, and the PNE device may also operate in various environments including devices such as a fax machine, a scanner, a printer, a TeleVision (TV), a set top box, an audio, a camera, an MP3 player, a PMP, a refrigerator, a washing machine, a microwave oven, etc. Accordingly, a conventional authentication method is not suitable for the PNE device, and all devices using such a system should implement secure storage spaces in order to protect against malicious authentication.

SUMMARY OF THE INVENTION

Accordingly, the present invention has been made to solve the above stated problems occurring in the prior art, and the present invention provides a method and device for authenticating a PNE which is a heterogeneous device through a PN GW which can securely communicate with a CPNS server in an environment where the PNE and the PN GW have a transmission channel which cannot guarantee the safety between them and the PNE cannot have a secure storing apparatus.

The present invention also provides a method and device for authenticating a device desired to be authenticated by a user, the device not having an input apparatus and not being able to directly communicate with a server.

In accordance with an aspect of the present invention, there is provided a method of authenticating a Personal Network Entity (PNE). The method includes transmitting, by a Personal Network GateWay (PN GW) a PNE serial number ($SN_{PNE}$) to a CPNS (Converged Personal Network Service) server; storing an authentication value chain of a PNE received from the CPNS server and an inherent assignment key ($TK_{PNE}$) that is secret information of a corresponding PNE; encrypting a selected authentication value from among the authentication value chain with the inherent assignment key of the corresponding PNE; transmitting the encrypted authentication value to the corresponding PNE; storing, by the corresponding PNE, the encrypted authentication value; and performing an authentication procedure between the corresponding PNE and the CPNS server by using the encrypted authentication value stored in the PNE.

In accordance with another aspect of the present invention, there is provided a method of authenticating a Personal Network Entity (PNE). The method includes storing, by a PN GW (Personal Network GateWay), when a PNE requests an authentication, a physical address ($MAC_{PNE}$) of the PNE and transferring the physical address ($MAC_{PNE}$) of the PNE together with the authentication request to a CPNS (Converged Personal Network Service) server; identifying, by the CPNS server, the physical address ($MAC_{PNE}$) of the PNE, generating a random number R to be used in an authentication session, and transmitting the R together with an authentication response; storing, by the PN GW, the R transmitted from the CPNS server, generating a NONCE to be used for a PIN generation, and transmitting the R and the NONCE together with the authentication response to the PNE; generating, by the PNE, a Personal Identification Number (PIN) through a preset PIN generation function, generating a Random Pin (RP), and displaying information on the generated PIN and RP; performing, by the PN GW upon receiving inputs of the PIN and the RP displayed in the PNE from a user, a verification of the PIN input through the PIN generation function; receiving, by the PN GW, when the verification of the PIN is completed, inputs of a user ID ($ID_{USER}$) and a user password ($PW_{USER}$) from the user, applying the user ID ($ID_{USER}$) and the user password ($PW_{USER}$) to a hash function H( ) to generate a value W required when the PNE requests an authentication from the CPNS server, transmitting the user ID ($ID_{USER}$), the W, the NONCE, and the RP to the CPNS server, and making an identification request; identifying, by the CPNS server, information for the identification request transmitted from the PN GW, identifying an effectiveness of the user and the PNE, and transmitting an authentication confirmation message to the PN GW; and transferring, by the PN GW, the authentication confirmation message to the PNE, and completing an authentication procedure.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, the embodiments of the present invention are described with reference to the accompanying drawings. In the following description, a detailed explanation of known related functions and constitutions may be omitted to avoid unnecessarily obscuring the subject matter of the present invention.

Figure 1:
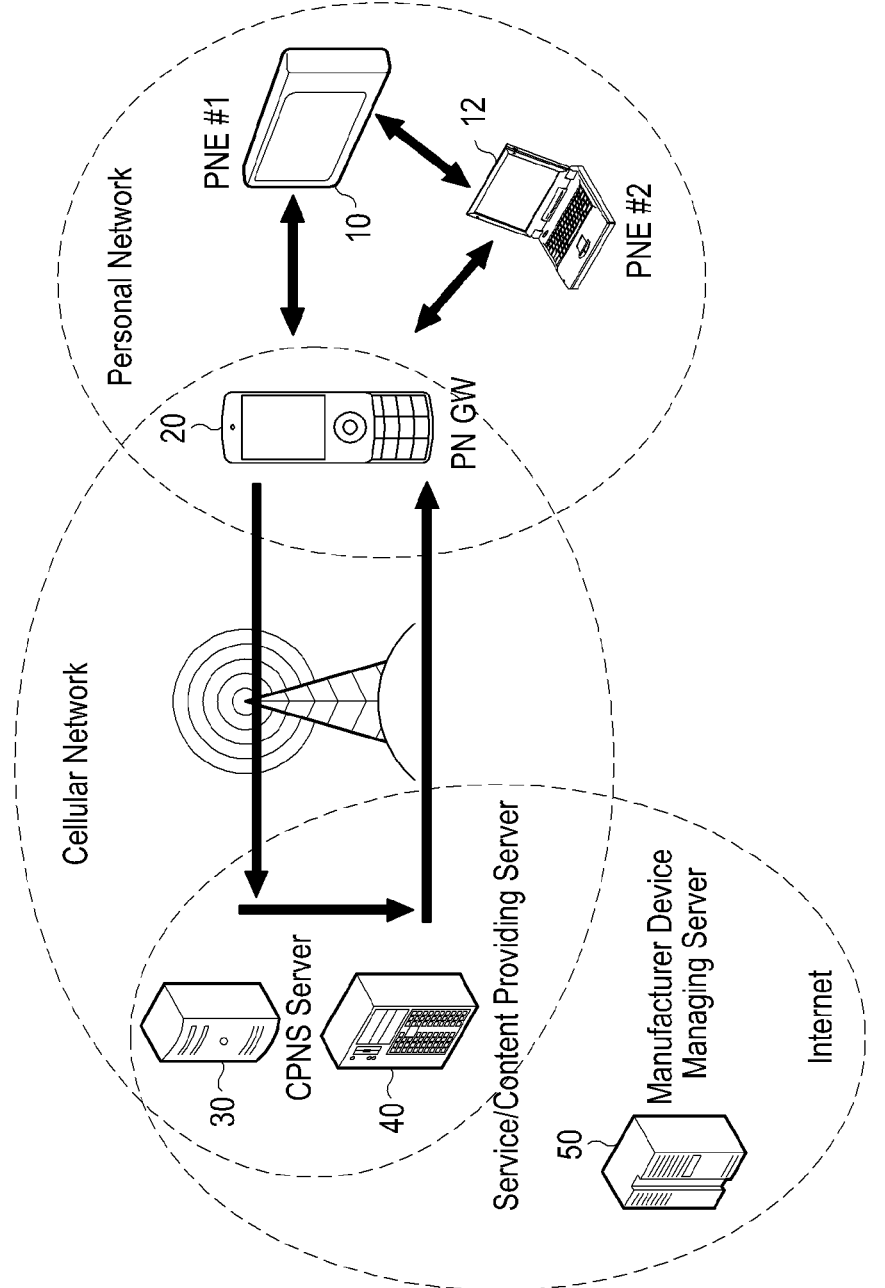
FIG. 1 is a diagram of a CPNS system to which an embodiment of the present invention is applied.

FIG. 1 is a diagram of a CPNS system according to an embodiment of the present invention.

Referring to FIG. 1, a CPNS system according to an embodiment of the present invention may include one or more Personal Network Entities (PNEs) 10 and 12, a Personal Network GateWay (PN GW) 20, a CPNS server 30, and a service/content providing server 40 and may include a manufacturer device managing server 50, which can be connected to the above elements through an internet, as well.

The service/content providing server 40 is located in an external network, and corresponds to a device providing a service or content that a user can use in the CPNS server 30. For example, the external network may be an Internet and/or a mobile phone network. Further, the CPNS server 30 may include the service/content providing server 40 and the manufacturer device managing server 50.

The PNEs 10 and 12 refer to user terminal devices directly executing a service. For example, the PNEs may include devices such as an MP3 player, a PMP, a mobile communication terminal, etc., and the PNEs reproduce content stored in them to provide a user with a service. The PNEs 10 and 12 have a short distance communication module therein in order to perform short distance communication with another neighboring device, i.e., another PNE or a PN gateway.

The PNEs 10 and 12 are electronic devices that directly provide a service to a user. For example, the PNE may include various types of electronic devices, such as an MP3 player, a PMP, a game machine, a notebook, a navigation unit, etc., as well as consumer electronics such as a refrigerator. The electronic devices receive content requested by a user from the service/content providing server 40 and reproduce the content so that the user can receive a service. The PNEs 10 and 12 have a short distance communication module therein so they can perform short distance communication with another neighboring device (i.e., another PNE or PN gateway).

The PNEs 10 and 12 perform a pairing with the PN GW 20 in a short distance communication scheme and configure a personal network with the PN GW 20, so that the PNEs 10 and 12 can access the CPNS server 30 through the PN GW 20 and receive a content provided by the service/content providing server 40 to use a CPNS.

In this example, configuration of the personal network refers to an identification of a role of each physically paired device and a configuration of a network between the PNEs 10 and 12 and the PN GW 20 in order to provide a CPNS. For the configuration, a determination is performed as to whether there are CPNS resources between the PNEs 10 and 12 and the PN GW 20, as well as whether the device can use the CPNS through an authentication and an authorization, and a device's role is identified. As described above, a process of identifying whether the device is operated with a GW mode or a PNE mode is performed, so that a network is formed in an aspect of an application for providing the CPNS. Through the personal network formed as described above, the PNEs 10 and 12 can access the CPNS server 30 of a service provider network by using a communication function of the PN GW 20.

The PN GW 20 is a device capable of accessing the CPNS server 30 located in an external network, i.e., the service provider network. Further, the PN GW 20 can configure a personal network with the PNEs 10 and 12 and relays a CPNS system message and a service or a content transmission between the CPNS server 30 and the PNEs 10 and 12. That is, when the PNEs 10 and 12 included in the personal network 30 request a service, the PN GW 20 performs a relay function to transfer the service to the CPNS server 30. Further, the PN GW 20 transfers a service or content provided by the CPNS server 30 to the PNEs 10 and 12. The PN GW 20 may be a device such as, a mobile phone, a PDA, a set top box, etc.

The CPNS server 30 registers and manages the PN GW 20, the PNEs 10 and 12, and the personal network according to a registration request from the PN GW 20, and processes a request for a service or a content transferred by the PNEs 10 and 12 through the PN GW 20. When the service or the content corresponding to the request can be provided by the CPNS server 30, the CPNS server 30 provides the requested service and content to the PNEs 10 and 12 through the PN GW 20. Further, when the service or the content corresponding to the request can be provided by the CPNS server 30, the request is transferred to the external service/content providing server 40 and the corresponding service or content is provided to the PNEs 10 and 12 through the PN GW 20.

Figure 2:
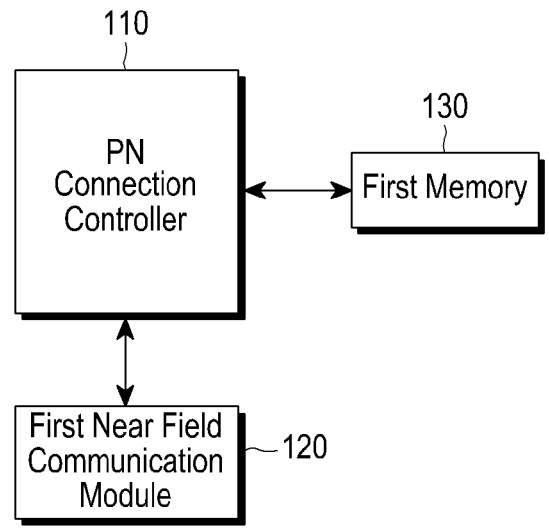
FIGS. 2, 3, and 4 are block diagrams of a PNE, a PN gateway, and a CPNS server according to an embodiment of the present invention, respectively.

FIG. 2 is block diagram of PNEs according to an embodiment of the present invention.

Referring to FIG. 2, the PNEs 10 and 12 include a PN connection controller 110, a first short distance communication module 120, and a first memory 130. The first short distance communication module 120 performs short distance communication and may perform, for example, Bluetooth communication, Zigbee communication (i.e., ZIGBEE® specification-compliant communication), Infrared Data Association (IrDA) communication (i.e., IRDA® specification-compliant communication), visible light communication, etc. The first memory 130 may be used as a working memory of the PN connection controller 110, may store various program data, which are required for configuring a personal network, containing information required for an authentication procedure according to characteristics of the present invention which will be described later, and may store device information. The first memory 130 also stores information on various services provided from the CPNS server 30 through the PN GW 20. The PN connection controller 110 controls all operations of the PNEs 10 and 12 related to a configuration and a release of the personal network and the authentication procedure according to characteristics of embodiments of the present invention, which are described later herein, and controls an operation related to a service or a content request and a service or a content reception through the configured personal network. Accordingly, the PN connection controller 110 controls the first short distance communication module 120 in order to configure the personal network and performs a physical for pairing with neighboring devices in order to configure a communication link. The PN connection controller 110 also searches for the PN GW in the physically paired devices and requests a network connection when the PN GW 20 is detected.

Figure 3:
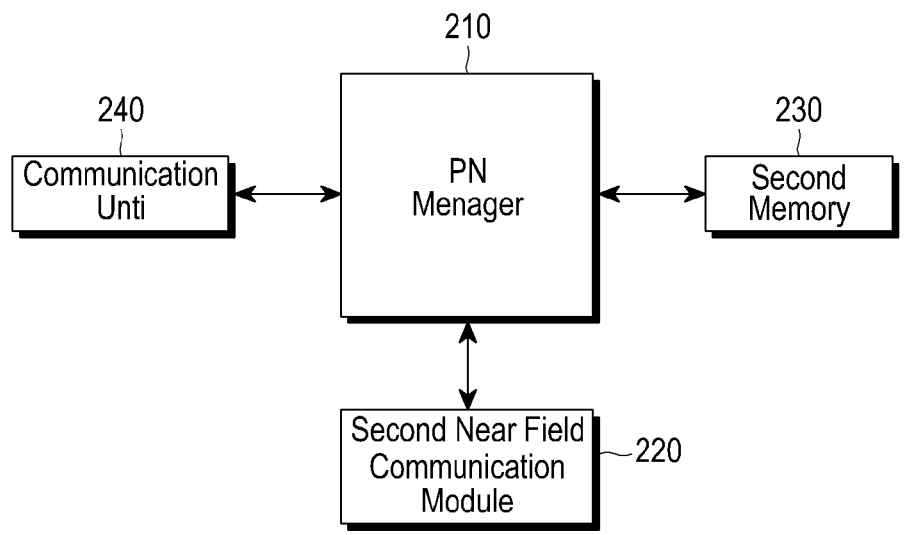

FIG. 3 is a block diagram of a PN GW according to an embodiment of the present invention.

Referring to FIG. 3, the PN GW 20 includes a PN manager 210, a second short distance communication module 220, a second memory 230, and a communication unit 240. The second short distance module 220 performs short distance communication and may perform, for example, Bluetooth communication, Zigbee communication, IrDA communication, visible light communication, etc. The communication unit 240 performs communication with entities of an external network and transmits/receives messages and data to/from the CPNS server 30 and the service/content providing server 40. The second memory 230 may be a working memory of the PN manager 210, and may store various program data required for a personal network configuration. The second memory 230 also stores information on the PNEs connected to the personal network and information regarding a device corresponding to each PNE, including information required for an authentication procedure described later herein. The PN manager 210 controls a general operation of the PN GW 20 related to the personal network.

Figure 4:
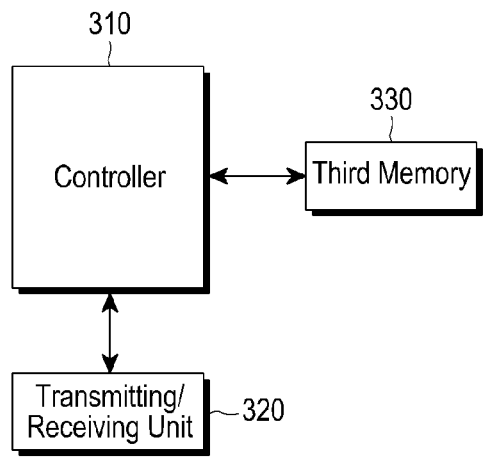

FIG. 4 is a block diagram of a CPNS server according to an embodiment of the present invention.

Referring to FIG. 4, the CPNS server 30 includes a controller 310, a transmitting/receiving unit 320, and a third memory 330. The transmitting/receiving unit 320 communicates with the PN GW 20 and the service/content providing server 40 according to a control of the controller 310. The third memory 330 registers and stores PNE information transferred from the PN GW 20. The third memory 330 stores various contents and services to be provided to the PNEs, and also stores a service matching table corresponding to each of the contents and services. The service matching table includes information regarding minimum device functions and capabilities required for the PNEs that will receive and process a corresponding content or service. Further, the third memory 330 stores information required for an authentication of the PNE according to characteristics of the present invention, which is described later herein. The controller 310 controls a general operation of the CPNS server 30.

In the above-described CPNS system according to embodiments of the present invention, a PNE authentication method implemented according to characteristics of the present invention may be divided into two types. A first type corresponds to a method of authenticating the PNE through a serial number generated and assigned only by a manufacturer device managing service, and a second type corresponds to an authentication method in which there is a minimum number of displays in the device and numbers or letters can be expressed in the displays of the device.

A mutual authentication method between the PNE and the CPNS server by using a hash-chain according to an embodiment of the present invention is described as follows with reference to FIGS. 5-7. In this hash-chain method, the CPNS server registers a required PNE hardware inherent value (serial number) in advance and uses the registered value in a device authentication.

Since it is difficult to assume that all PNEs have secure storage spaces, the hash-chain method encrypts and stores secret information and then receives an authentication value from the PN GW to authenticate the PNE when needed.

Table 1 below includes a listing of terms and definitions corresponding to the method, which are described in further detail later herein.

TABLE 1

| Terms | Contents |
| --- | --- |
| $K_{SM}$ | Shared Key between the CPNS server and the manufacturer |
| $K_{GS}$ | Shared key between the PN GW and the CPNS server |
| $AK_{PNE}$ | PNE authentication value, authentication key |
| $[AK_{PNE}]$ | Set of the PNE authentication values |
| $SN_{PNE}$ | Serial number which is not stored in the memory of the PNE |
| $E\_K(\ )/D\-K(\ )$ | Encryption/Decryption using K |
| $TK_{PNE}$ | PNE assignment key (Temporary Key), Key used for transmitting secure data between the PNE and the PN GW or used for authenticating the CPNS server by the PNE |
| $Seed_{PNE}$ | Seed value for a hash-chain of the PNE |
| H | Secure hash function in cryptography (e.g.: SHA1) |

A process of storing PNE authentication information according to the hash-chain method is described as follows with reference to FIGS. 5-7.

Figure 5:
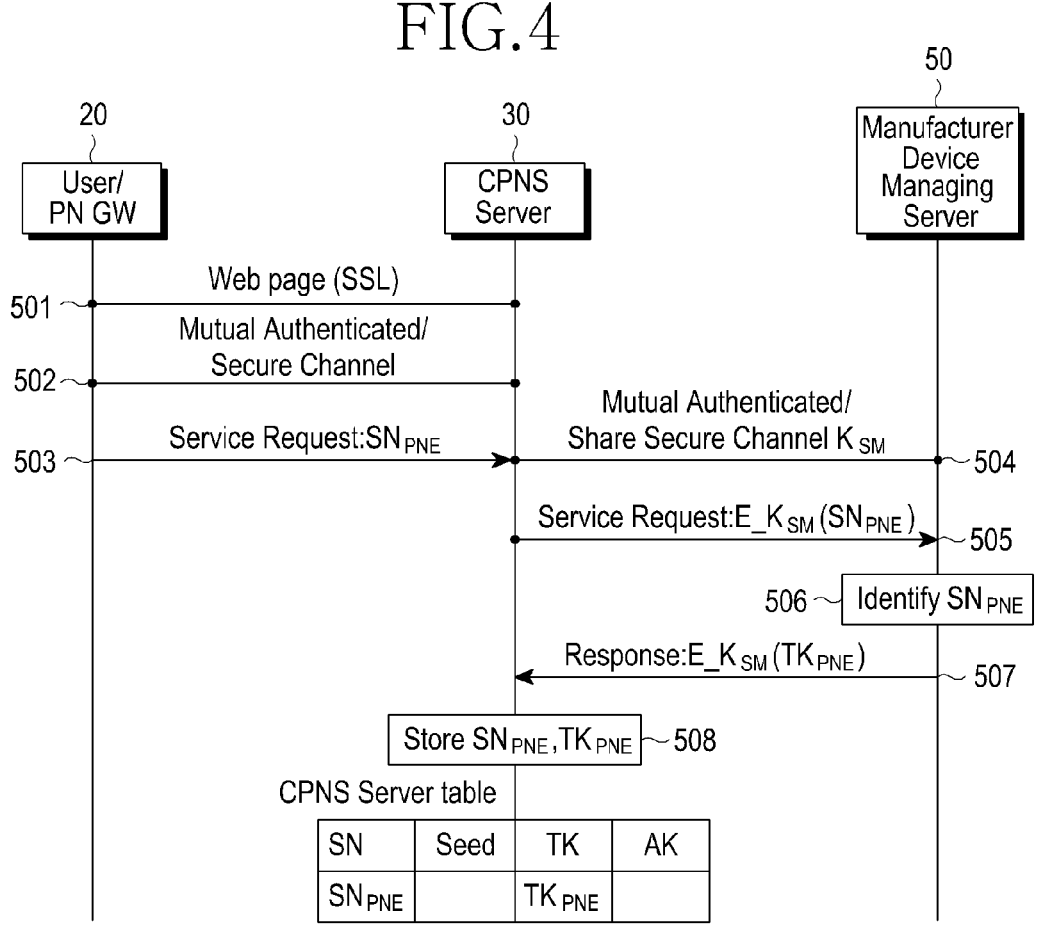
FIG. 5 is flowchart illustrating a process of storing PNE authentication related information for a PNE authentication in a CPNS server according to an embodiment of the present invention.

FIG. 5 is flowchart illustrating a process of storing PNE authentication related information for a PNE authentication in a CPNS server according to an embodiment of the present invention.

Referring to FIG. 5, a CPNS server 30 according to an embodiment of the present invention sends a request for a PNE assignment key ($TK_{PNE}$) according to a PNE identifier ($SN_{PNE}$) to the manufacturer device managing server 50 and stores the requested information. The following described operations may be performed in an operation in which the CPNS server 30 stores the PNE assignment key according to the PNE identifier.

In step 501, for a PNE registration process, the CPNS server 30 configures a secure channel with the PN GW 20 through a web service and then provides a PNE registration service to a user. If step 501 is performed, then step 502 is not performed. Similarly, if step 502 is performed, step 501 is not performed. In step 502, for the PNE registration process, the PN GW 20 configures a secure channel with the CPNS server 30 and then provides a PNE registration service to a user.

In step 503, for the PNE registration process, the user physically identifies $SN_{PNE}$ of the PNE through step 501 or step 502 and then registers the $SN_{PNE}$ in the CPNS server 30. At this time, the $SN_{PNE}$ corresponds to a number provided to a PNE user when purchasing the PNE and is not stored in a storage space of the PNE. The $SN_{PNE}$ refers to a PNE entity IDentifier (ID) and is indicated as an SN.PNE or an SN.P-NGW according to a PNE's role acting as the PNE or the GW, respectively. The CPNS server 30 has sufficient secure storage space.

In step 504, the CPNS server 30, after receiving the $SN_{PNE}$ from the user, configures a secure channel with the manufacturer device managing server 50 through a mutual authentication process using a base authentication technology (e.g. 3$^{rd}$ Generation Partnership Project (3GPP) Generic Bootstrapping Architecture (GBA)) for a $SN_{PNE}$ identification. In step 505, the CPNS server 30 transmits the $SN_{PNE}$ to the manufacturer device managing server 50 through the secure channel.

In step 506, the manufacturer device managing server 50 identifies whether serial numbers other than $SN_{PNE}$ extensions (*.PNE, *.PNGW) are valid. In, step 507, when the identification process is completed, the manufacturer device managing server 50 transmits the $TK_{PNE}$, which is secret information corresponding to the $SN_{PNE}$, to the CPNS server 30 through the secure channel.

In step 508, the CPNS server 30 stores the $SN_{PNE}$ input by the user and the $TK_{PNE}$ transmitted from the manufacturer device managing server 50 in its storage space. The $SN_{PNE}$ and the $TK_{PNE}$ are used in an authentication procedure of the CPNS server 30 in the future.

Figure 6:
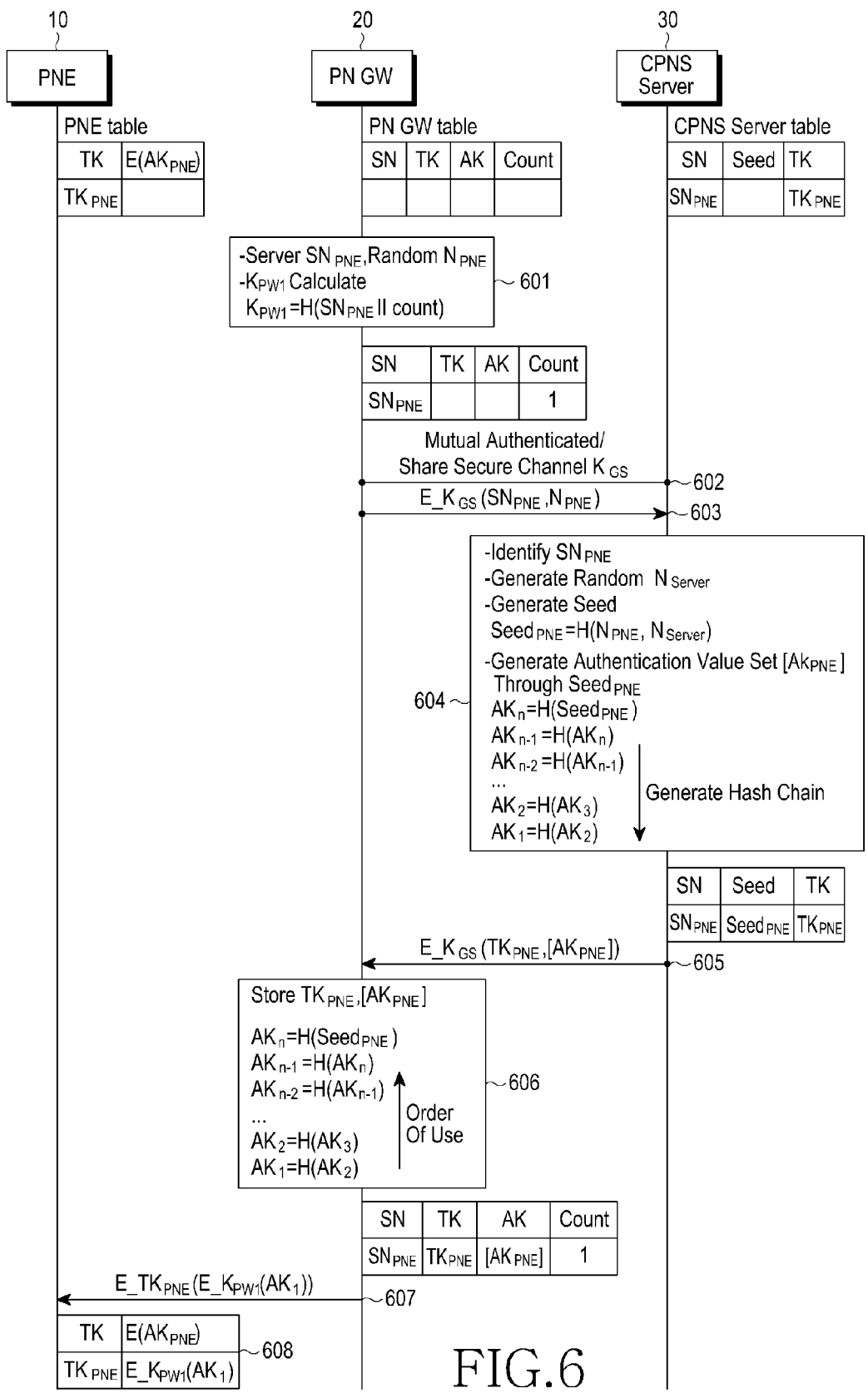
FIG. 6 is a flowchart illustrating a process for storing PNE authentication related information for a PNE authentication in a PN GW and a PNE according to an embodiment of the present invention.

FIG. 6 is a flowchart illustrating a process of storing a PNE authentication key ($AK_{PNE}$) in a PN GW and a PNE for PNE authentication according to an embodiment of the present invention.

Referring to FIG. 6, the following operations may be performed in connection with an operation of storing a PNE authentication value in the PNE 10 and the PN GW 20.

The PNE 10 initially stores its inherent $TK_{PNE}$ in a manufacturing process. Meanwhile the PN GW 20 does not initially store information on the PNE 10, because the PN GW 20 does not know which PNE will be registered in the PN GW 20 itself. However, a secure storage space for securely storing PNE information is required in a PNE registration. Further, the CPNS server 30, having performed the process of storing the PNE assignment key and the $SN_{PNE}$ of the PNE 10 in the CPNS server 30 as shown in FIG. 5, stores the $SN_{PNE}$ and the $TK_{PNE}$, which are information regarding the PNE 10, in the secure storage space.

In step 601, for a PNE-PN GW registration process, the user inputs the $SN_{PNE}$ and a random $N_{PNE}$ in the PN GW 20. At this time, the PN GW 20 generates $K_{PW1}$=H($SN_{PNE}$∥count) by using the $SN_{PNE}$ input from the user. The count refers to a count value managed by the GW. The count is initially set as "1" and is increased by "1" in each subsequent authentication process. The $K_{PW1}$ refers to a security key value for additionally encrypting a PNE authentication key that will be stored in the PNE 10 in the future, and a generation of the $K_{PW1}$ may not be performed depending on a security level.

In step 602, the PN GW 20 performs a mutual authentication process with the CPNS server 30 by using a base authentication technology (e.g., 3GPP GBA) and then configures a secure channel.

In step 603, the PN GW 20 transmits the $SN_{PNE}$ and the $N_{PNE}$ to the CPNS server through the secure channel. At this time, according to embodiments of the present invention the $SN_{PNE}$ and the $N_{PNE}$ may be encrypted by using a shared key $K_{GS}$ between the PN GW 20 and the CPNS server 30 and then the encrypted $SN_{PNE}$ and the $N_{PNE}$ is transmitted, as an example but the present invention is not limited thereto and other various schemes may be applied in accordance with embodiments of the present invention.

In step 604, through the $SN_{PNE}$, the CPNS server 30 identifies that a device user has input the $SN_{PNE}$ through the PN GW 20 and then generates a random number $N_{Server}$ to create $Seed_{PNE}$=H($N_{PNE}$∥$N_{Server}$). Next, the CPNS server 30 generates an authentication value chain of the PNE 10 through the created $Seed_{PNE}$ as follows:

$$AK_n = H(Seed_{PNE})$$
$$AK_{n-1} = H(AK_n)$$
$$AK_{n-2} = H(AK_{n-1})$$
$$\ldots$$
$$AK_2 = H(AK_3)$$
$$AK_1 = H(AK_2)$$

The authentication value chain is generated to compensate for a difficulty of implementing a space in which the PNE 10 can securely and permanently store one PNE authentication value. The $AK_{PNE}$ can be renewed within the generated chain value whenever the PNE 10 requests an authentication or the authentication value chain is expired, so that the security can be guaranteed even though the PNE authentication value is exposed to an outside entity.

A length of the authentication chain is determined by a service provider, and an expired authentication chain should be updated through communication between the PN GW 20 and the CPNS server 30. For example, when a service renewal attempt is performed every 30 days, a length of the authentication chain is set to be 30 chains long. When a service renewal attempt is performed annually, a length of the authentication chain may be set to be 365 chains long. In order to renew the expired authentication chain, the PNE 10 user should input an appropriate $SN_{PNE}$ again and pass a registration process.

In step 605, the CPNS server 30 generates the PNE authentication value chain and then transmits [$AK_{PNE}$] and $TK_{PNE}$ to the PN GW 20. According to embodiments of the present invention, the [$AK_{PNE}$] and the $TK_{PNE}$ may be encrypted by using a shared key $K_{GS}$ between the PN GW 20 and the CPNS server 30 and then the encrypted [$AK_{PNE}$] and the $TK_{PNE}$ is transmitted as an example, but the present invention is not limited thereto and other various schemes may be applied in accordance with embodiments of the present invention.

In step 606, the PN GW 20 receives the [$AK_{PNE}$] and the $TK_{PNE}$, and then the PN GW 20 stores information on the [$AK_{PNE}$] and the $TK_{PNE}$ in its storage space.

In step 607, the PN GW 20 encrypts $AK_1$ corresponding to a first authentication value among the [$AK_{PNE}$] using the $K_{PW1}$, encrypts the encrypted $AK_1$, that is $E\_K_{PW1}(AK_1)$, using the $TK_{PNE}$, and transmits the encrypted $AK_1$, that is $E\_TK_{PNE}(E\_K_{PW1}(AK_1))$, to the PNE 10. The $AK_1$ among the [$AK_{PNE}$] is encrypted by using the $K_{PW1}$ in order to prevent the $AK_1$ from being known through information stored in the PNE 10, even if the PNE 10 is stolen. The process of encrypting the $AK_1$ using the $K_{PW1}$ may be omitted when the $K_{PW1}$ is not generated in step 601 as necessary. The encrypted the $AK_1$ by using $K_{PW1}$ is also encrypted by using the $TK_{PNE}$ in order to provide the safety a transmission channel between the PNE 10 and the PN GW 20.

In step 608, the PNE 10 stores the encrypted $E\_K_{PW1}(AK_1)$ in its storage space.

Figure 7:
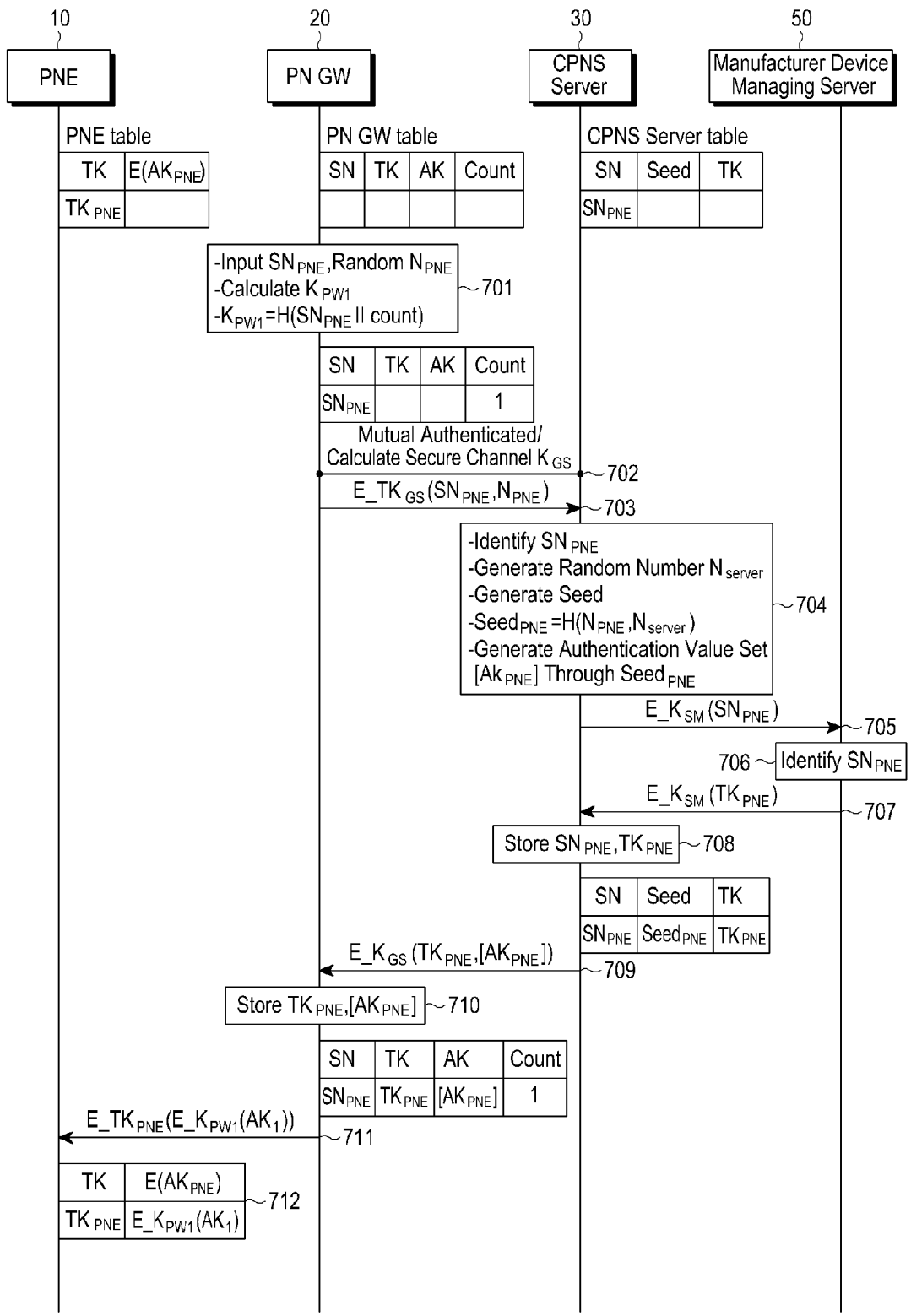
FIG. 7 is a flowchart illustrating a process for storing PNE authentication related information for a PNE authentication in a CPNS server, a PN GW and a PNE according to another embodiment of the present invention.

FIG. 7 is a flowchart illustrating a process of storing PNE authentication information according to another embodiment of the present invention.

Referring to FIG. 7, the following operations may be performed in a series of operations for storing a PNE authentication key and PNE assignment keys between the PNE 10, the PN GW 20, the CPNS server 30, and the manufacturer device managing server 50.

In step 701, the user inputs the $SN_{PNE}$ and the $N_{PNE}$ in the PN GW 20. At this time, the PN GW 20 generates $K_{PW1}=H(SN_{PNE} \| count)$ by using the $SN_{PNE}$. The count, which refers to a count value managed by the GW, is initially set as "1" and is increased by "1" in each authentication process performed in the future. The $SN_{PNE}$ is a PNE 10 entity ID and is indicated as an SN.PNE or an SN.PNGW according to a PNE 10's role acting as the PNE 10 or the GW, respectively. The $K_{PW1}$ is a security key value for additionally encrypting a PNE authentication key that will be stored in the PNE 10 in the future, and the $K_{PW1}$ may not be generated depending on a security level.

In step 702, the PN GW 20 performs a mutual authentication process with the CPNS server 30 by using a base authentication technology (e.g., 3GPP GBA) and then configures a secure channel.

In step 703, the PN GW 20 transmits the $SN_{PNE}$ and the $N_{PNE}$ to the CPNS server 30 through the secure channel. According to embodiments of the present invention the $SN_{PNE}$ and the $N_{PNE}$ may be encrypted by using a shared key $K_{GS}$ between the PN GW 20 and the CPNS server 30, and then the encrypted $SN_{PNE}$ and the $N_{PNE}$ may be transmitted as an example However, the present invention is not limited to this scheme, and other such schemes may be used in accordance with embodiments of the present invention. In step 704, the CPNS server 30 identifies the $SN_{PNE}$ and the $N_{PNE}$, and then generates a random number $N_{Server}$ to create $Seed_{PNE}=H(N_{PNE} \| N_{Server})$. Next, the CPNS server 30 generates an authentication value chain of the PNE 10 through the created $Seed_{PNE}$ as follows:

$$AK_n = H(Seed_{PNE})$$

$$AK_{n-1} = H(AK_n)$$

$$AK_{n-2} = H(AK_{n-1})$$

$$\ldots$$

$$AK_2 = H(AK_3)$$

$$AK_1 = H(AK_2)$$

A length of the authentication chain is determined by a service provider, and an expired authentication chain should be updated through communication between the PN GW 20 and the CPNS server 30. For example, when a service renewal attempt is performed every 30 days, a length of the authentication chain is set to be 30 chains long. When a service renewal attempt is performed annually, a length of the authentication chain may be set to be 365 chains long. In order to renew the expired authentication chain, the PNE 10 user should input an appropriate $SN_{PNE}$ again and pass a registration process.

In step 705, the CPNS server 30 transmits the $SN_{PNE}$ to the manufacturer device managing server 50 through the secure channel. In step 706, the manufacturer device managing server 50 identifies whether serial numbers other than $SN_{PNE}$ extensions (*.PNE, *.PNGW) are valid. In step 707, after the identification is complemented, the manufacturer device managing server 50 transmits the PNE assignment key ($TK_{PNE}$) corresponding to the $SN_{PNE}$ to the CPNS server 30 through the secure channel.

In step 708, the CPNS server 30 stores the $SN_{PNE}$ input by the user and the $TK_{PNE}$, which corresponds to the $SN_{PNE}$, is transmitted from the manufacturer device managing server 50 in a secure storage space. The $SN_{PNE}$ and the $TK_{PNE}$ are used in an authentication procedure of the PNE 10 and the CPNS server 30 in the future.

In step 709, the CPNS server 30 generates the authentication value chain of the PNE 10 and then transmits the [$AK_{PNE}$] and the $TK_{PNE}$ to the PN GW 20 through the secure channel. According to embodiments of the present invention, the [$AK_{PNE}$] and the $TK_{PNE}$ may be encrypted by using a shared key $K_{GS}$ between the PN GW 20 and the CPNS server 30, and then the encrypted the [$AK_{PNE}$] and the $TK_{PNE}$ may be transmitted. However, the present invention is not limited thereto, and other schemes may be used in accordance with embodiments of the present invention.

In step 710, the PN GW 20 receives the [$AK_{PNE}$] and the $TK_{PNE}$ and then stores the received data in its storage space. In step 711, the PN GW 20 encrypts $AK_1$ corresponding to a first authentication value among the [$AK_{PNE}$] using the $K_{PW1}$, encrypts the encrypted $AK_1$ (i.e., $E\_K_{PW1}(AK_1)$) using the $TK_{PNE}$, and transmits the further encrypted $AK_1$ (i.e., $E\_TK_{PNE}(E\_K_{PW1}(AK_1))$), to the PNE 10. The $AK_1$ among the [$AK_{PNE}$] is encrypted by using the $K_{PW1}$ in order to prevent the $AK_1$ from being known through information stored in the PNE 10, even if the PNE 10 is stolen. The process of encrypting the $AK_1$ using the $K_{PW1}$ may be omitted when the $K_{PW1}$ is not generated in step 601, as necessary. The encrypted the $AK_1$ using $K_{PW1}$ is also encrypted by using the $TK_{PNE}$ in order to provide the safety a transmission channel between the PNE 10 and the PN GW 20.

In step 712, the PNE 10 stores the $AK_1$ or an $E\_K_{PW1}(AK_1)$ encrypted using the $TK_{PNE}$ in its storage space.

A PNE-CPNS authentication process according to the hash-chain method is described as follows with reference to FIG. 8.

Figure 8:
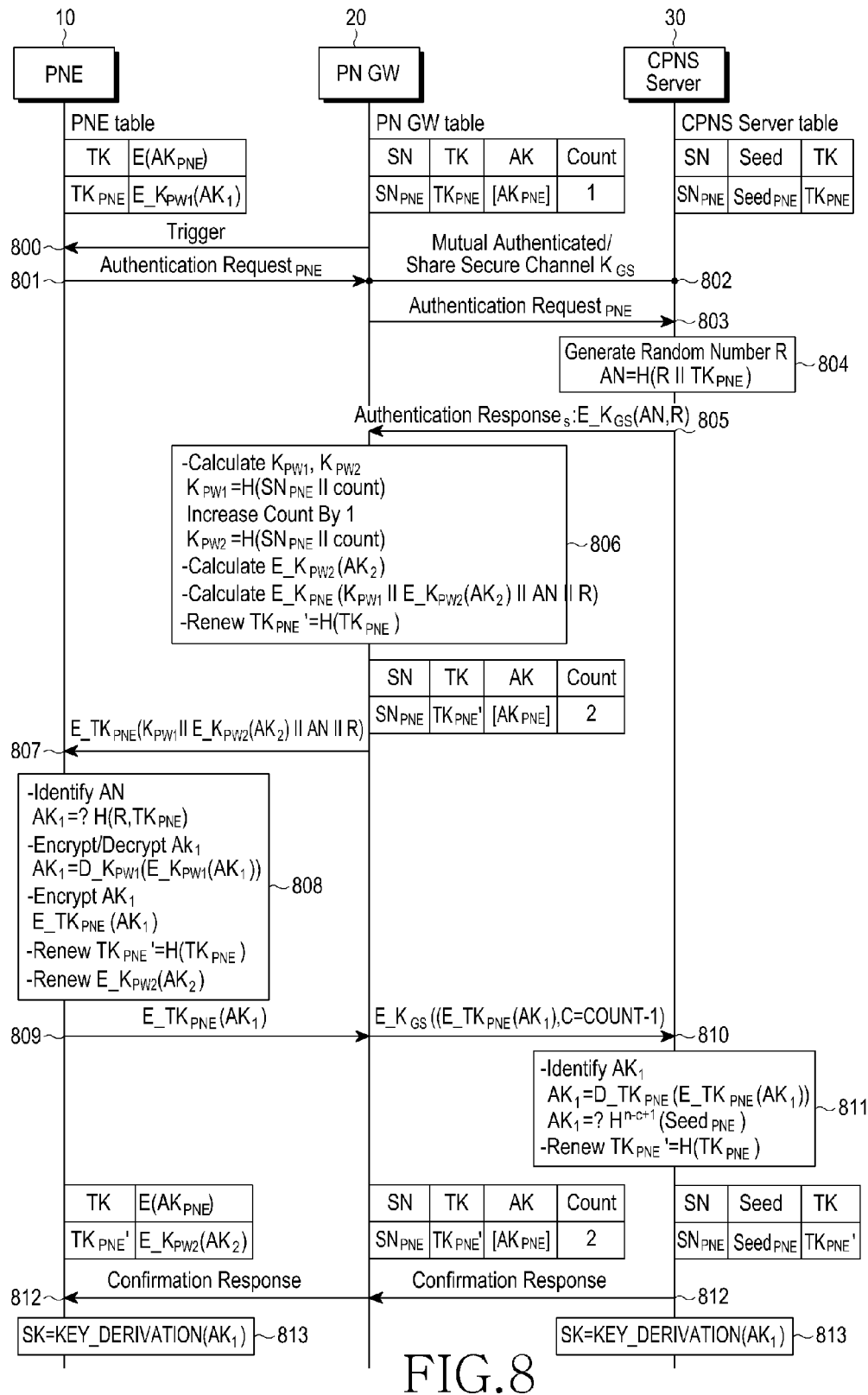
FIG. 8 is a flowchart illustrating authentication between a PNE and a CPNS server through a PN GW according to an embodiment of the present invention.

FIG. 8 is a flowchart illustrating an authentication between the PNE and the CPNS server through a PN GW according to an embodiment of the present invention.

Referring to FIG. 8, the PNE 10 stores the $TK_{PNE}$, and the encrypted $AK_1$ using $K_{PW1}$, that is $E\_K_{PW1}(AK_1)$. The PN GW 20 stores the $SN_{PNE}$, the $TK_{PNE}$, [$AK_{PNE}$], and count corresponding to the PNE 10. THE CPNS server 30 stores the $SN_{PNE}$, the $TK_{PNE}$, and $Seed_{PNE}$ corresponding to the PNE 10. The following operations may be performed in the authentication operation between the PNE 10 and the CPNS server 30 through the PN GW 20. In step 800, the PN GW 20 transmits a trigger message to the PNE 10 in order to enable the PNE 10 to transmit an authentication request message Authentication Request$_{PNE}$. In step 801, the PNE 10 transmits the authentication request message Authentication Request$_{PNE}$ to the PN GW 20 for an authentication.

In step 802, the PN GW 20 performs a mutual authentication process with the CPNS server 30 by using a base technology (e.g., 3GPP GBA), and then configures a secure channel. In step 803, the PN GW 20 transmits the authentication request message Authentication Request$_{PNE}$ to the CPNS server 30 through the secure channel.

In step 804, the CPNS server 30, having received the Authentication Request$_{PNE}$, generates a random number R and then generates a confirmation value(AN)(AN=H(R||$TK_{PNE}$)) corresponding to a value for an authentication from the CPNS server 30.

In step 805, the CPNS server 30 transmits the AN and the R to the PN GW 20 through the secure channel.

In step 806, the PN GW 20, having received the AN and the R, generates $K_{PW1}$=H($SN_{PNE}$||count). Next, the PN GW 20 increases the count by "1" and generates $K_{PW2}$=H($SN_{PNE}$||count). Further, the PN GW 20 calculates an $E\_TK_{PNE}(K_{PW1})$ encrypted by using the $TK_{PNE}$ and an $E\_K_{PW2}(AK_2)$ encrypted by using the $K_{PW2}$. The PN GW 20 having completed all processes changes the $TK_{PNE}$ into a $TH_{PNE}$=H($TH_{PNE}$). An encryption key of the authentication value $AK_{PNE}$ is consistently changed at this time so that an attacker cannot know the encryption key of the $AK_{PNE}$ unless the attacker persistently hacks a session, even when the attacker obtains the $TK_{PNE}$ stored in the storage space of the PNE 10 in order to discover the $K_{PW1}$ through hacking the communication session of the PNE 10 and the PN GW 20. In step 807, the PN GW 20 transmits the $E\_TK_{PNE}(K_{PW1}||E\_K_{PW2}(AK_2)||AN||R)$ to the PNE 10. That is, the PN GW 20 transmits the encrypted $K_{PW1}$, $E\_K_{PW2}(AK_2)$, AN and R by using the $TK_{PNE}$.

In step 808, the PNE 10 decrypts $K_{PW1}$, $E\_K_{PW2}(AK_2)$, AN and R using the $TK_{PNE}$ stored in its storage space. The PNE 10 identifies whether the AN is generated in a proper CPNS server 30 by using the $TK_{PNE}$ stored in its storage space and the transmitted R and then decrypts a transmitted value to the $TK_{PNE}$ to obtain the $K_{PW1}$. Next, the PNE 10 decrypts the $E\_K_{PW1}(AK_1)$ using the $K_{PW1}$ to obtain the $AK_1$. The PNE 10 also encrypts the AK1 using the $TK_{PNE}$ to calculate the $E\_K_{PNE}(AK_1)$. Subsequently, the PNE 10 deletes the $E\_K_{PW1}(AK_1)$ from its storage space, stores the $E\_K_{PW2}(AK_2)$ transmitted from the PN GW 20, and replaces the $TK_{PNE}$ with a $TK_{PNE'}$. In step 809, the PNE 10 transmits the $E\_TK_{PNE}(AK_1)$ to the PN GW 20.

In step 810, the PN GW 20 transmits the $E\_TK_{PNE}(AK_1)$ received from the PNE 10 and a value C generated by subtracting "1" from the count stored in its storage space to the CPNS server 30 through the secure channel. In step 811, the CPNS server 30 receives the C and the $E\_TH_{PNE}(AK_1)$ from the PN GW 20 and then decrypts the $E\_TH_{PNE}(AK_1)$ uging the $TK_{PNE}$ stored in its storage space to obtain the $AK_1$. Next, the CPNS server 30 identifies whether the $AK_1$ is the same as an $H^{n-c+1}(Seed_{PNE})$ by using a $Seed_{PNE}$ stored in its storage space. When the identification is completed, the CPNS authenticates that the PNE 10 has transmitted a proper $AK_1$. Next, the CPNS server 30 replaces the $TK_{PNE}$ with a $TK_{PNE'}$. If the $AK_1$ is different from the $H^{n-c+1}(Seed_{PNE})$, the CPNS server 30 stops an authentication session.

In step 812, when the $AK_1$ identification is completed, the CPNS server 30 transmits an authentication confirmation message "Confirmation Response". The PN GW 20 transmits the Confirmation Response to the PNE 10.

In step 813, after all authentications are completed, the PNE 10 and the CPNS server 30 generate a common session key SK by using a key derivation function KEY_DERIVATION( ) as defined in the following equation:

SK=KEY_DERIVATION($AK_1$)

A password based authentication method using a PNE display according to an embodiment of the present invention is described as follows with reference to FIGS. 8-10. The password based method is divided into a device registration procedure and an authentication procedure, and all PNE hardware inherent address values (MAC) are registered in a server in advance to use the values in a device authentication. Further, according to the method, it is assumed that a method of displaying simple-numbers or letters is supported in most appliance terminals.

An initial registration method of the PNE according to the password based authentication method is described as follows with reference to FIGS. 9A and 9B.

Figure 9A:
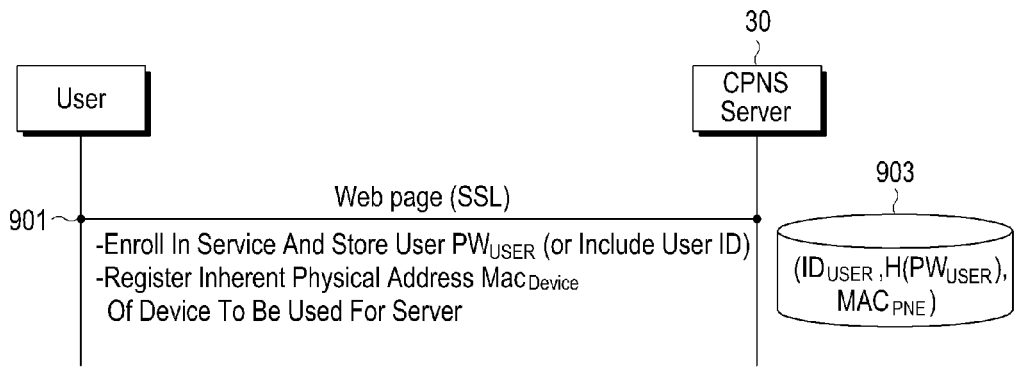
FIGS. 9A and 9B are flowcharts illustrating registration of a CPNS server by a PNE according to another embodiment of the present invention.
Figure 9B:
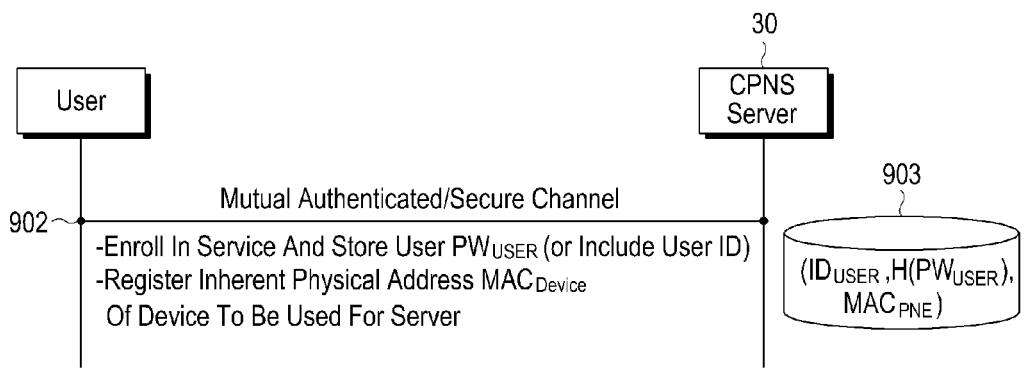

FIGS. 9A and 9B are flowcharts illustrating registration of the CPNS server 30, by the PNE 10, according to another embodiment of the present invention.

Referring to FIGS. 9A and 9B, the following operations may be performed in an initial registration process between the PNE 10 and the CPNS server 30. Instep 901, the user sets an ID "$ID_{USER}$" and a password "$PW_{USER}$" for a service authentication and subscribes a service through a web service. At this time, the user's $ID_{USER}$ and $PW_{USER}$ are used for the user's service authentication. Further, the user registers a physical address ($MAC_{PNE}$) of device(s), which the user desires to use in the CPNS server 30, in the CPNS server 30. When step 901 is performed, step 902 of FIG. 9B is not performed. Similarly, when step 902 is performed, step 901 is not performed. In step 902, the user can register the $ID_{USER}$ and the $PW_{USER}$ in the CPNS server 30 by using the PN GW 20 belonging to the user for a service authentication regardless of step 901. In step 903, the CPNS server 30 stores user's input $ID_{USER}$, $PW_{USER}$, and $MAC_{USER}$ in a DB.

A PNE authentication process according to the password based authentication method is described as follows with reference to FIG. 10.

Figure 10:
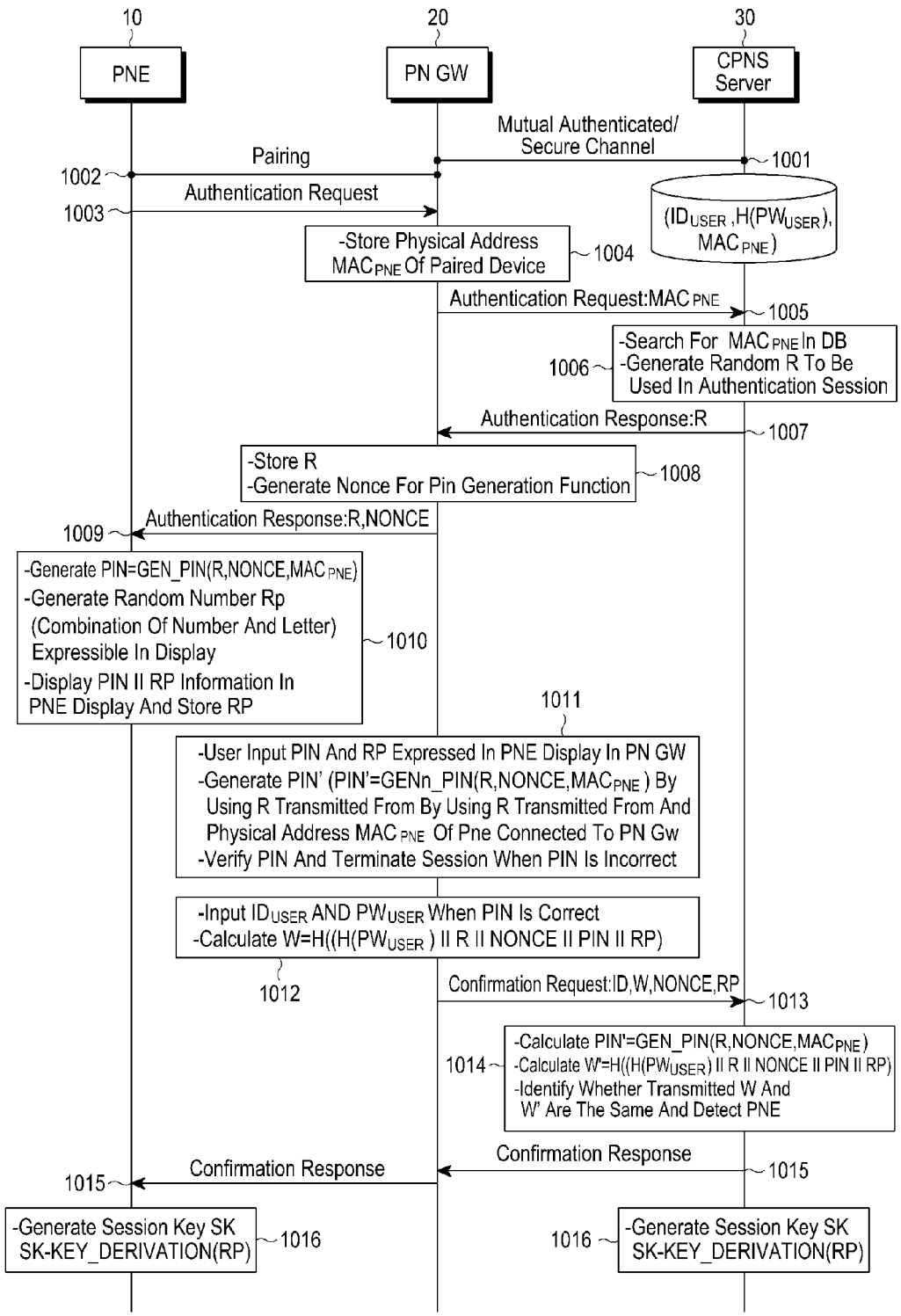
FIG. 10 is a flowchart illustrating authentication between a PNE and a CPNS server through a PN GW according to another embodiment of the present invention.

FIG. 10 is a flowchart illustrating an authentication between the PNE and the CPNS server through the PN GW according to another embodiment of the present invention.

Referring to FIG. 10, the following operations may be performed in an authentication operation between the PNE 10 and the CPNS server 30 through the PN GW 20.

In step 1001, for a PNE registration process, the PN GW 20 and the CPNS server 30 have sufficient storage spaces and configure a secure channel by using a base authentication technology (e.g., 3GPP GBA) after a mutual authentication process. Through this authentication process, a confidentiality of a traffic generated between the PN GW 20 and the CPNS server 30 is guaranteed.

In step 1002, the PNE 10 performs a pairing process with a PN GW 20, which becomes a GW of the PNE 10. In step 1003, the PNE 10 makes an authentication request from the PN GW 20. At this time, the user is an entity that first attempts the authentication request, so that the user may construct a specific function enabling the PNE 10 to make the authentication request or construct a user interface allowing the user to make the authentication request from the PN GW 20 itself.

In step 1004, in the authentication request, the PN GW 20 stores a physical address of the PNE 10 trying to make the authentication request. In step 1005, the PN GW 20 transmits an authentication request message Authentication Request to the CPNS server 30. At this time, the PN GW 20 also transmits the $MAC_{USER}$ of the PNE 10 making the authentication request. In step 1006, the CPNS server 30, having received the Authentication Request, searches for a corresponding $MAC_{USER}$ in its user DB, and generates a random number R to be used for an authentication session when an existing record is found. If there is no corresponding $MAC_{USER}$ in its DB, the CPNS rejects the authentication. In step 1007, the CPNS server 30 includes the R in the Authentication Response and transmits the Authentication Response.

In step 1008, the PN GW 20 stores the R included in the transmitted Authentication Response and generates a NONCE to be used for a PN generation. In step 1009, the PN GW 20 includes the R and the NONCE in the Authentication Response and transmits the Authentication Response to the PNE 10.

In step 1010, the PNE 10 generates a Personal Identification Number (PIN) through a set PIN generation function GEN_PIN( ) as defined in the following equation:

$$PIN=GEN\_PIN(R,NONCE,MAC_{USER})$$

At this time, the GEN_PIN( ) should have one-way function. The PNE 10 also generates a Random PIN (RP). At this time, in a display of the PNE 10, a number is used or a number and a character string are mixedly used as an expressible character string. The PNE 10 expresses generated information in a form of PIN||RP in the display and waits for a response.

In step 1011, the user inputs the PIN||RP expressed in the display in the PN GW 20. The user directly inputs the expressed information in the PN GW 20 without passing through a channel configured between the PNE 10 and the PN GW 20, so that secure communication can be performed independent of a confidentiality of a channel between the PNE 10 and the PN GW 20. The PN GW 20 generates a PIN' as shown in the following equation and attempts verification:

$$PIN'=GEN\_PIN(R,NONCE,MAC_{USER})$$

At this time, if a PIN verification fails, an authentication session is stopped. A load generated in the server authentication may be reduced through first blocking an incorrect authentication request by the PN GW 20.

However, in step 1012, when the PIN information is correct, the PN GW 20 additionally receives an input of the $ID_{USER}/PW_{USER}$ from the user. Further, a server authentication value W for the server authentication of the PNE 10 is generated by using the input $PW_{USER}$ as defined in the following equation:

$$W=H(H(PW_{USER})||R||NONCE||PIN||RP)$$

In step 1013, the PN GW 20 transmits a confirmation request message Confirmation Request to the CPNS server 30. At this time, the IDUSER, the W, the NONCE, and the RP are included in the message.

In step 1014, the CPNS server 30 calculates a PIN' and a W' as shown in the following equations and inspects an effectiveness of the user and the PNE 10: PIN'=GEN_PIN(R, NONCE, $MAC_{USER}$)

$$W'=H(H(PW_{USER})||R||NONCE||PIN'||RP)$$

If the W and the W' are different from each other, an authentication session is stopped.

In step 1015, the CPNS server 30 transmits the authentication confirmation message Confirmation Response. The PN GW 20 transfers the Confirmation Response to the PNE 10 and continuously performs a GW service.

In step 1016, after all authentications are completed, the PNE 10 and the CPNS server 30 generate a common session key SK by using a key derivation function KEY_DERIVATION( ) as defined in the following equation:

$$SK=KEY\_DERIVATION(RP)$$

According to the PNE authentication method according to embodiments of the present invention, the CPNS server 30 can authenticate the PNE 10, which is a heterogeneous device, through the PN GW 20, which can securely communicate with the CPNS server 30, without a separate secure storage space in the PNE 10. Further, the PNE authentication method provides a scheme capable of effectively authenticating a device, which a user desires to authenticate but has no input apparatus and cannot directly communicate with the server.

As described above, according to the embodiments of the present invention, it is possible to perform an operation for authenticating the PNE 10.

While the present invention has been shown and described with reference to certain exemplary embodiments and drawings thereof, it will be understood by those skilled in the art that various changes in form and details may be made therein without departing from the spirit and scope of the invention as defined by the appended claims.

What is claimed is:

1. A method of authenticating a Personal Network Entity (PNE), comprising:

transmitting, by a Personal Network GateWay (PN GW) a PNE serial number ($SN_{PNE}$) to a Converged Personal Network Service (CPNS) server;

storing, by the PN GW, an authentication value chain of a PNE received from the CPNS server and an inherent assignment key ($TK_{PNE}$) that is secret information of a corresponding PNE;

encrypting, by the PN GW, a selected authentication value from among the authentication value chain by using the $TK_{PNE}$;

transmitting, by the PN GW, the encrypted authentication value to the corresponding PNE so that the encrypted authentication value is stored in the corresponding PNE; and performing, by the PN GW, an authentication procedure between the corresponding PNE and the CPNS server by using the encrypted authentication value stored in the corresponding PNE.

2. The method as claimed in claim 1, wherein the PN GW generates an encryption key ($K_{GS}$) by using the $SN_{PNE}$, and the selected authentication value among the authentication value chain and the $TK_{PNE}$ are encrypted by using the $K_{GS}$.

3. The method as claimed in claim 1, wherein the CPNS server receives the $SN_{PNE}$ through a web service.

4. The method as claimed in claim 1, wherein the CPNS server receives the $SN_{PNE}$ through the PN GW.

5. The method as claimed in claim 1, wherein, when the CPNS server receives the $SN_{PNE}$, the CPNS server transmits the $SN_{PNE}$ to a manufacturer device managing server, receives a confirmation of the $SN_{PNE}$ from the manufacturer device managing server receives the $TK_{PNE}$, which is the secret information of the corresponding PNE, from the manufacturer device managing server, and stores the inherent $TK_{PNE}$ together with the $SN_{PNE}$.

6. The method as claimed in claim 5, wherein performing, by the PN GW, the authentication procedure between the corresponding PNE and the CPNS server comprises:

transmitting, by the PN GW, when the PNE requests an authentication, authentication request information to the CPNS server;

receiving, by the PN GW, a confirmation value AN and a random number R from the CPNS server, wherein the R is generated, and the AN is generated by calculating AN=H(R||$TK_{PNE}$), where H(m||n) is a hash function with an input of m concatenated with n;

generating a $K_{PW1}$=H($SN_{PNE}$||count), where the count is initially set as "1", increasing the count by 1 to generate a $K_{PW2}$=H($SN_{PNE}$||count), calculating an E_$TK_{PNE}$ ($K_{PW1}$) and an E_$K_{PW2}$(AK$_2$), where E_x(y) is an encryption function for encrypting y by using a key x, and changing the $TK_{PNE}$ into a changed inherent assignment key $TK_{PNE'}$, $TK_{PNE'}$=H($TK_{PNE}$), by the PN GW having received the AN and the R;

transmitting an E_$TK_{PNE}$($K_{PW1}$||E_$K_{PW2}$(AK$_2$)||AN||R) to the PNE by the PN GW, where E_x(y||z) is an encryption function for encrypting y and z by using a key x;

wherein it is identified that the AN is generated in a proper CPNS server by using the $TK_{PNE}$ stored in the PNE and the transmitted R, the transmitted E_$TK_{PNE}$ ($K_{PW1}$||E_$K_{PW2}$(AK$_2$)||AN||R) is decrypted by using the $TK_{PNE}$ to obtain the $K_{PW1}$ and the E_$K_{PW2}$(AK$_2$) by the PNE, an E_$K_{PW1}$(AK$_1$) is decrypted by using the $K_{PW1}$ to obtain an AK$_1$, an E_$TK_{PNE}$(AK$_1$) is calculated by the PNE, the E_$K_{PW1}$(AK$_1$) is deleted from a storage space of the PNE, the E_$K_{PW2}$(AK$_2$) transmitted from the PN GW is stored in the storage space, and the $TK_{PNE}$ is replaced with the $TK_{PNE'}$ by the PNE;

receiving, by the PN GW, the E_$TK_{PNE}$(AK$_1$) from the PNE;

transmitting, by the PN GW, the E_$TK_{PNE}$(AK$_1$) received from the PNE and a second count C generated by subtracting 1 from the count stored in a storage space of the PN GW to the CPNS server;

wherein the E_$TK_{PNE}$(AK$_1$) and the C is received from the PN GW, the E_$TK_{PNE}$(AK$_1$) is decrypted by using the $TK_{PNE}$ stored in a storage space of the CPNS server to obtain the AK$_1$ by the CPNS server, it is determined that the PNE of the CPNS server has transmitted a proper AK$_1$, and the $TK_{PNE}$ is replaced with the $TK_{PNE'}$ by the CPNS server;

receiving, by the PN GW, an authentication confirmation message from the CPNS server;

transferring, by the PN GW, the authentication confirmation message to the PNE and completing an authentication procedure, where $K_{PW1}$ is a first encryption key, $K_{PW2}$ is a second encryption key, AK$_1$ is a first authentication key, and AK$_2$ is a second authentication key.

7. A method of authenticating a Personal Network Entity (PNE), comprising:

storing, by a Personal Network GateWay (PN GW), when a PNE requests an authentication, a physical Media Access Control address of the PNE (MAC$_{PNE}$) and transferring the MAC$_{PNE}$ together with the authentication request to a Converged Personal Network Service CPNS server;

identifying, by the CPNS server, the MAC$_{PNE}$, generating a random number R to be used in an authentication session, and transmitting the R together with an authentication response;

storing, by the PN GW, the R transmitted from the CPNS server, generating a NONCE to be used for a Personal Identification Number (PIN) generation, and transmitting the R and the nonce together with the authentication response to the PNE;

generating, by the PNE, a PIN through a preset PIN generation function, generating a Random Pin (RP), and displaying information on the generated PIN and RP;

performing, by the PN GW upon receiving inputs regarding the PIN and the RP from a user, a verification of the PIN input through the PIN generation function;

receiving, by the PN GW, when the verification of the PIN is completed, inputs of a user IDentification (ID$_{USER}$) and a user password (PW$_{USER}$) from the user, applying the user ID$_{USER}$ and the user password PW$_{USER}$ to a hash function H( ) to generate a value W required when the PNE requests an authentication from the CPNS server, transmitting the ID$_{USER}$, the W, the NONCE, and the RP to the CPNS server, and making an identification request;

identifying, by the CPNS server, information for the identification request transmitted from the PN GW, identifying an effectiveness of the user and the PNE, and transmitting an authentication confirmation message to the PN GW; and transferring, by the PN GW, the authentication confirmation message to the PNE, and completing an authentication procedure.

8. The method as claimed in claim 7, wherein the CPNS server registers the ID$_{USER}$ and the PW$_{USER}$ from the user through a web service and also registers a MAC$_{PNE}$.

9. The method as claimed in claim 7, wherein the CPNS server registers the ID$_{USER}$ and the PW$_{USER}$ from the user through the PN GW and also registers a MAC$_{PNE}$.

10. A Personal Network GateWay (PN GW) device for authenticating a Personal Network Entity (PNE), comprising:

a communication unit configured to transmit a PNE serial number (SN$_{PNE}$) to a Converged Personal Network Service (CPNS) server;

a memory configured to store an authentication value chain of a PNE received from the CPNS server and an inherent assignment key (TK$_{PNE}$) that is secret information of a corresponding PNE;

a PN manager configured to encrypt a selected authentication value from among the authentication value chain by using the TK$_{PNE}$; and a short distance communication module configured to transmit the encrypted authentication value to the corresponding PNE so that the encrypted authentication value is stored in the corresponding PNE, wherein the PN manager performs an authentication procedure between the corresponding PNE and the CPNS server by using the encrypted authentication value stored in the corresponding PNE.

11. The PN GW device as claimed in claim 10, wherein the PN GW generates an encryption key ($K_{GS}$) by using the $SN_{PNE}$, the selected authentication value among the authentication value chain and the $TK_{PNE}$ are encrypted by using the $K_{GS}$.

12. The PN GW device as claimed in claim 10, wherein $SN_{PNE}$ is received through a web service by the CPNS server.

13. The PN GW device as claimed in claim 10, wherein the $SN_{PNE}$ is received through the PN GW by the CPNS server.

14. The PN GW device as claimed in claim 10, wherein, when the CPNS server receives the $SN_{PNE}$, the $SN_{PNE}$ is transmitted to a manufacturer device managing server, a confirmation of the $SN_{PNE}$ is received from the manufacturer device managing server, the $TK_{PNE}$, which is the secret information of the corresponding PNE, is received from the manufacturer device managing server, and the $TK_{PNE}$ is stored together with the $SN_{PNE}$ by the CPNS server.

15. The PN GW device as claimed in claim 14, wherein
when the PNE requests an authentication, the PN manager transmits authentication request information to the CPNS server, and receives a random number R and a confirmation value AN;
wherein the R is generated, and the AN is generated by calculating AN=H(R||$TK_{PNE}$), where H(m||n) is a hash function with an input of m concatenated with n;
wherein the PN manager generates a $K_{PW1}$=H($SN_{PNE}$||count), where the count is initially set as "1", by using the hash function H( ), increases the count by 1 to generate a $K_{PW2}$=H($SN_{PNE}$||count), calculates an $E\_TK_{PNE}$($K_{PW1}$) and an $E\_K_{PW2}$($AK_2$), where $E\_x(y)$ is an encryption function for encrypting y by using a key x, changes the $TK_{PNE}$ into a changed inherent assignment key $TK_{PNE'}$, $TK_{PNE'}$=H($TK_{PNE}$),
and transmits an $E\_TK_{PNE}$($K_{PW1}$||$E\_K_{PW2}$($AK_2$)||AN||R) to the PNE;
wherein it is identified that the AN is generated in a proper CPNS server by using the $TK_{PNE}$ stored in the PNE and the transmitted R, and the transmitted $E\_TK_{PNE}$($K_{PW1}$||$E\_K_{PW2}$($AK_2$)||AN||R) is decrypted by using the $TK_{PNE}$ to obtain the $K_{PW1}$ and the $E\_K_{PW2}$($AK_2$) by the PNE, an $E\_K_{PW1}$($AK_1$) is decrypted by using the $K_{PW1}$ to obtain an $AK_1$, an $E\_TK_{PNE}$($AK_1$) is calculated by the PNE, the $E\_K_{PW1}$($AK_1$) is deleted from a storage space of the PNE, the $E\_K_{PW2}$($AK_2$) transmitted from the PN GW is stored in the storage space, and then replacing the $TK_{PNE}$ is replaced with the $TK_{PNE'}$ by the PNE;
wherein the PN manager receives the $E\_TK_{PNE}$($AK_1$), and transmits the $E\_TK_{PNE}$($AK_1$) received from the PNE and a second count C generated by subtracting 1 from the count stored in a storage space of the PN GW to the CPNS server;
wherein the $E\_TK_{PNE}$($AK_1$) and the C are received from the PN GW, the $E\_TK_{PNE}$($AK_1$) is decrypted by using the $TK_{PNE}$ stored in a storage space of the CPNS server to obtain the $AK_1$ by the CPNS server, it is determined that the PNE of the CPNS server has transmitted a proper $AK_1$, and the $TK_{PNE}$ is replaced with the $TK_{PNE'}$ by the CPNS server;
wherein the PN manager receives an authentication confirmation message from the CPNS server,
transfers the authentication confirmation message to the PNE, and completes an authentication procedure,
where $K_{PW1}$ is a first encryption key, $K_{PW2}$ is a second encryption key, $AK_1$ is a first authentication key, and $AK_2$ is a second authentication key.

16. A method of authenticating a Personal Network Entity (PNE) in a Personal Network GateWay (PN GW), comprising:
receiving an authentication response together with a random number R to be used in an authentication session for the PNE from the CPNS server;
storing the R transmitted from the CPNS server;
generating information to be used for a Personal Identification Number (PIN) generation;
transmitting the R and the information together with the authentication response to the PNE;
receiving a PIN and a Random PIN (RP) from a user;
performing a verification of the PIN using the R, the information, and a physical Media Access Control address of the PNE ($MAC_{PNE}$);
receiving, when the verification of the PIN is completed, inputs of a user IDentification ($ID_{USER}$) and a user password ($PW_{USER}$) from the user;
applying the user $ID_{USER}$ and the $PW_{USER}$ to a hash function H( ) to generate a value W for the CPNS server authentication of the PNE;
transmitting an identification request including the $ID_{USER}$, the W, the information, and the RP to the CPNS server;
receiving an authentication confirmation message from the CPNS server; and
transferring the authentication confirmation message to the PNE.

17. The method as claimed in claim 16, wherein when the PNE requests an authentication, the PN GW stores the $MAC_{PNE}$, transfers the $MAC_{PNE}$ together with the authentication request to the CPNS server and then receives the authentication response together with the R from the CPNS server.

18. The method as claimed in claim 17, wherein the R is generated by the CPNS server, when a $MAC_{PNE}$ corresponding to the transferred $MAC_{PNE}$ is searched from a user database of the CPNS server.

19. The method as claimed in claim 17, wherein the PIN is generated by the PNE using a PIN generation function, the RP is generated by the PNE and data on the PIN and the RP is displayed on a display of the PNE.

20. The method as claimed in claim 17, wherein when an effectiveness of the user and the PNE is identified by the CPNS server using the $ID_{USER}$, the W, the information, and the RP, the authentication confirmation message is transmitted from the CPNS server.

21. A method of authenticating a Personal Network Entity (PNE) in the PNE, comprising:
transmitting an authentication request of the PNE to a Personal Network GateWay (PN GW);
receiving an authentication response together with a random number R to be used in an authentication session and information to be used for a Personal Identification Number (PIN) generation from the PN GW;
wherein the R is generated by a Converged Personal Network Service (CPNS) server, when a physical Media Access Control address of a PNE ($MAC_{PNE}$) is transferred from the PN GW to the CPNS server and a $MAC_{PNE}$ corresponding to the transferred $MAC_{PNE}$ is searched from user database of the CPNS server and wherein the NONCE is generated by the PN GW;
generating a PIN using the R, the information, the $MAC_{PNE}$ and a PIN generation function and a Random PIN (RP);
displaying data on the PIN and the RP; and receiving an authentication confirmation message from the PN GW;

wherein the authentication confirmation message is transmitted from the CPNS server to the PN GW, when an authentication of the PNE by the PN GW succeeds and the CPNS server uses the R, the information, the $MAC_{PNE}$, the PIN, the RP, and the PIN generation function.

* * * * *